April 19, 1938. A. M. BRIGGS 2,114,760
HYDRAULIC VALVE
Filed Feb. 18, 1935
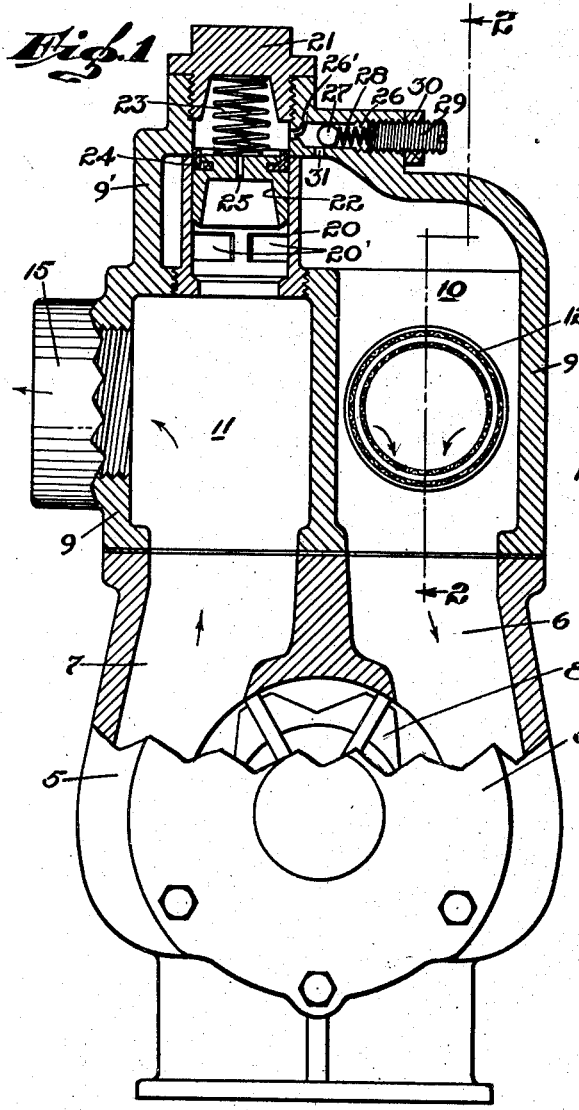
INVENTOR.
Arthur M. Briggs
BY
ATTORNEY.

Patented Apr. 19, 1938

2,114,760

UNITED STATES PATENT OFFICE 2,114,760

HYDRAULIC VALVE

Arthur M. Briggs, Los Angeles, Calif., assignor to Harman Pacific Company, Los Angeles, Calif.

Application February 18, 1935, Serial No. 7,040

1 Claim. (Cl. 137—139)

My invention relates to hydraulic valves of the type designed to be installed in a pump, that is, between the intake and discharge chambers thereof, whereby, when the discharge flow is closed for any reason before the pump is stopped, said valve will operate to permit the flow from the discharge side of the pump to be directed back into the intake chamber and to be circulated through the pump.

My improved hydraulic valve can also be interposed in a pipe line and is adapted, when the discharge flow is to be stopped or closed, to close automatically when a small bleeder-flow-control valve is moved to its closed position, the pressure of the still liquid in the valve operating to move the main valve to its closed position against the lesser pressure of the moving liquid passing through the valve.

One of the objects of my invention is to provide a simple, economical hydraulic valve of the character referred to and which has a minimum number of parts and is practical and efficient in performing the function for which it is designed.

In order to explain my invention, I have illustrated the same on the accompanying sheet of drawings, in which—

Figure 1 is a vertical sectional view through a pump, with my hydraulic valve shown in place therein;

Figure 2 is a fragmentary sectional view taken on the line 2—2 of Fig. 1;

Figure 3 is a longitudinal sectional view of my hydraulic valve as adapted to be connected in a pipe line; and Figure 4 is a cross sectional view thereof taken on line 4—4 of Fig. 3.

Referring now in detail to the drawing, I will describe my invention as embodied in a pump.

A pump body 5, with intake passageway 6, and discharge passageway 7, has a rotor 8 therein, and this mechanism is, of course old and well known in the art. A connecting member 9 is mounted thereon, with intake chamber 10 and an outlet chamber 11 therein. In the intake chamber 10 is mounted a cylindrical screen or strainer 12, held at one end by a plug 13, and at its other end by means of a coupling bushing, or the like, designated 14, and to which is connected the supply pipe for the liquid to be pumped, said liquid being drawn into the pump through said screen and discharged out through the discharge or outlet chamber 11, with which, as at 15, provision is made for connecting a discharge pipe or hose, not shown.

My invention proper is shown embodied in the construction above described and includes a cylindrical member 20, screwed into the upper wall of the discharge chamber 11, and extends within an extension 9' of said connecting member 9, substantially as illustrated, being in alinement with the top of said extension, into which is screwed a plug 21. Said cylindrical member 20 is provided with circumferentially extending openings 20' through its side, communicating with the intake chamber 10, through the upper part thereof, as shown clearly in Figure 1. Slidably mounted in said cylindrical member 20 is a valve 22, adapted to move over and close said openings 20'. While not needed in every case, yet I have provided a coiled spring above said valve 22 for moving it to closed position when there is no pressure in the valve chamber, as hereinafter referred to. Said valve is provided with an annular cup-like gasket 24, seated therein, and it is also provided with a bleeder opening or port 25 in its end. On the connecting member 9 is an extension portion forming a ball valve chamber, 26, with a ball valve 27, adapted to be moved to a valve seat 26' by a spring 28, the tension of which can be regulated by means of a screw 29, on which is a lock nut 30, as clearly illustrated in Fig. 1. An outlet port 31 from said valve chamber 26 is shown, opening into the intake chamber 10. The opening at the valve seat 26' and the outlet port 31, are larger than the bleeder opening 25 in the valve.

The operation of the mechanism so far described may be briefly stated as follows:

Under normal pumping conditions the valve 22 is held closed by the pressure of the liquid above said valve, in the chamber in which the spring 23 is placed. Assuming that twenty pounds of pressure are required to move the ball valve 27 to open an escape for the liquid and reduce the pressure on said valve, the pressure above said valve 22 during the pumping operation holds it in closed position over the by-pass openings 20'. The liquid being pumped is being drawn in through the screen 12 to the intake passageway 10 and by the rotor 8 being forced out through the discharge passageway 11 to the discharge pipe or hose connected at 15 (not shown). If for any reason said discharge is closed, as by the closing of a discharge nozzle, while the pump continues to run, the pressure will be increased in the discharge chamber 11, and this builds up sufficient pressure on said valve 22 to move it to open position, as shown in Fig. 1, thus permitting the by-passing of the liquid from the discharge chamber 11, through said valve chamber openings 20' and to the intake chamber. The pressure above said valve 22 is sufficient to open the ball valve 27, and as the ports 26' and 31 are larger than the bleeder port 25, said pressure above said valve 22 is released out to the intake passageway and is carried therewith around the circuit within the pump body. When the discharge line is opened the pressure on the valve drops and the ball valve 27 closes, whereupon the pressure built up above said valve 22 moves it to closed position, and the intake is discharged out through the connection at 15 in the normal manner. The spring 23 above the valve 22 is provided simply to close the valve when there is no pressure of liquid in the pump and so that the valve will be moved to closed position to facilitate the starting of the pump, but it is not the purpose or need of the spring to close said valve under operating conditions, for the liquid pressure will close it, and the liquid pressure will open it, as above described.

Referring now to Fig. 3 of the drawing, I have shown my invention designed to be connected into a pipe line with the valve operable to close the pipe line, and the means for causing said valve to be closed being the simple closing of a small valve, rather than the operation of a large gate valve of the usual type.

In this embodiment of the invention, two body members 32 and 33 are coupled together, as at 34. The member 32 is provided with an inner cylindrical portion 32' having circumferentially extending openings 35 therein opening into the annular space 36 around the outside of said cylindrical portion 32'. A valve member 37 is slidably mounted within said cylindrical portion 32' and is adapted to close said openings 35 when moved to the left from the position shown in Fig. 3. Said valve 37 is also provided with a cup-like gasket 38, substantially as shown. Said valve 37 is also provided with a small bleeder port 37' in its end.

The body member 33 is provided with an inner transverse portion 39, with a chamber formed therein, designated 40, in which slidably fits a valve 41, with stem 42, working through a stuffing plug 43, and provided on its outer end with a push head 44. A flat faced disc-like portion is formed on said transverse portion, said disc-like portion being designated 39' and forms a closure for the end of the cylindrical member 32' and against which the annular gasket 38 bears when the valve member 37 is in its open position, as shown. This forms a chamber at the opposite side of said valve member 37, into which the bleeder port 37' opens and within which chamber pressure can be built up which operates to move said valve member 37 to closed position, when it covers and closes the flow openings 35. There is also formed in the transverse member 39 a larger bleeder opening 45, adapted to be opened and closed by the valve 41, on the operating stem 42.

When said members 32 and 33 are thus coupled together and are connected into a pipe line through which liquid is forced from left to right, as shown in Fig. 3, the liquid flows through the openings 35 and out through the annular passageway 36 and through the openings, designated 36', Fig. 4, and on through the member 33. Any flow through the bleeder opening 37' in said valve 37, escapes through the larger bleeder opening 45 in the transverse member 39, when the valve 41 is up, as shown. When it is desired to stop the general flow through the pipe line, instead of having to operate a large gate valve, it is only necessary to press down the valve 41, to close the openings 45, and the pressure built up in the chamber at the right hand end of the valve 37, moves said valve to the left and closes the openings 35, thus closing the flow passageway through said member 32 and accomplishing it with the simplest movement of a relatively small valve which can be moved with the thumb or finger pressure, and can be opened to release the pressure as easily. The improvement over a large and expensive gate valve will be recognized.

Thus I have provided in a pump of the character referred to a separate connecting member 9, having the intake chamber 10 and the discharge chamber 11, positioned to register with the intake 6 of the pump and the outlet 7 of the pump, when placed upon the pump body 5. I have also provided a tubular screen 12 with means for detachably or removably holding it in alinement with the supply connection so that the inflow is through the open end of the screen and thence through its side to the intake chamber and intake passageway of the pump. And I have also provided the valve-controlled means for opening communication from the outlet or discharge chamber 11 of the connecting member to the intake chamber 10 of said connecting member, said valve-controlled means being operable under a predetermined pressure, so that in case the discharge flow is shut-off while the pump is running and pressure is built up in said discharge chamber, said valve-controlled means automatically opens under such pressure and flows back into the intake chamber is established until the discharge is again opened. This construction makes it possible for a customer to purchase the connecting member with the screen and the control valve mechanism as a single, assembled unit ready to be mounted on the pump body.

I do not limit my invention to the details of construction and arrangement here shown for explanatory purposes except as I may be limited by the hereto appended claim.

I claim:

A hydraulic valve body in two pieces to be screwed together, each end being adapted to be connected into a pipe line for fluid under pressure, one of said pieces having therein a cylindrical member forming a valve chamber with lateral openings through its side into said body member, the other member of said body having therein a transverse wall member the central portion of which closes the end of the cylindrical member in said first part when said members are screwed together, said wall member having openings therethrough outside of said cylindrical member for passage of fluid and having a bleeder opening through its central part with control valve therefor, a valve member of uniform cylindrical form in said cylindrical member and adapted to be moved forwardly to close said lateral openings and close the passageway through said body, said valve member having a central bleeder opening to permit leakage of fluid therethrough to the opposite side of said valve member to move it to closed position, the front end of said valve member seating in said body in front of said lateral openings, and means for moving the control valve in said transverse wall member to relieve the pressure behind said valve to permit it to open.

ARTHUR M. BRIGGS.